(12) United States Patent
Kudoh

(10) Patent No.: US 9,118,837 B2
(45) Date of Patent: Aug. 25, 2015

(54) IMAGING APPARATUS

(75) Inventor: Tomoyuki Kudoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/440,662

(22) Filed: Apr. 5, 2012

(65) Prior Publication Data

US 2012/0281282 A1    Nov. 8, 2012

(30) Foreign Application Priority Data

May 2, 2011    (JP) ................................ 2011-102805

(51) Int. Cl.
| | | |
|---|---|---|
| G02B 23/16 | (2006.01) | |
| H04N 5/232 | (2006.01) | |
| H04N 5/225 | (2006.01) | |
| G03B 17/12 | (2006.01) | |

(52) U.S. Cl.
CPC ........... *H04N 5/23296* (2013.01); *H04N 5/225* (2013.01); *G03B 17/12* (2013.01); *G03B 2217/002* (2013.01)

(58) Field of Classification Search
CPC ... H04N 5/23296; H04N 5/225; G03B 17/12; G03B 2217/002
USPC .................. 359/512, 513; 250/200, 234, 239; 348/294, 374
See application file for complete search history.

(56) References Cited

U.S. PATENT DOCUMENTS

| | | | | |
|---|---|---|---|---|
| 5,198,664 A | * | 3/1993 | Fayfield ........................ | 250/239 |
| 5,783,815 A | * | 7/1998 | Ikeda ........................... | 250/208.1 |
| 5,811,798 A | * | 9/1998 | Maurin et al. ................. | 250/239 |
| 5,883,386 A | * | 3/1999 | Tsuyuki et al. ................ | 250/239 |
| 8,174,613 B2 | * | 5/2012 | Nakamura ..................... | 348/374 |
| 8,324,602 B2 | * | 12/2012 | Wiese et al. ................... | 250/551 |
| 2009/0180013 A1 | | 7/2009 | Kinoshita | |

FOREIGN PATENT DOCUMENTS

| | | |
|---|---|---|
| CN | 1523438 A | 8/2004 |
| EP | 1840639 A | 3/2007 |
| JP | 2001-021976 A | 1/2001 |
| JP | 2005-020103 | 1/2005 |
| JP | 2005-252990 A | 9/2005 |
| JP | 2008-193574 | 8/2008 |

OTHER PUBLICATIONS

Jun. 18, 2014 Chinese Office Action, which is enclosed with an English Translation, that issued in Chinese Patent Application No. 201210134976.9.

* cited by examiner

*Primary Examiner* — Frank Font
(74) *Attorney, Agent, or Firm* — Cowan, Liebowitz & Latman, P.C.

(57) ABSTRACT

The imaging apparatus holds an imaging element that converts a subject image that has been formed by an imaging optical system to an electric signal by a holding member. An optical member is disposed more toward the subject side than the imaging element and is installed on the holding member. A sealing member that is formed by an elastic material encloses the light receiving surface of the imaging element as a countermeasure for dust protection. A position restricting member provided on the sealing member carries out positioning by being inserted between the outer peripheral edge portion of the optical member and the holding member in a direction perpendicular to the optical axis of the imaging optical system.

18 Claims, 5 Drawing Sheets

FIG. 3B

IMAGING APPARATUS

BACKGROUND OF THE INVENTION

1. Field of the Invention

The present invention relates to a structure of a sealing member that is provided in an imaging lens barrel in an imaging apparatus such as a digital camera.

2. Description of the Related Art

A digital camera in which data for a photographed image is stored in a memory obtains image information by an imaging element. Disposing an optical filter having a function of controlling the wavelength of the incident light in front of an imaging element and in an optical axis direction is a typical configuration. Note that a configuration in which a glass plate is disposed in the manner of an optical filter is also known.

In order to prevent a foreign matter such as contaminants that adhere to the imaging surface of an imaging element from appearing as a ghost image in a photographed image, a sealing member that is formed by elastic material such as rubber is disposed between the optical filter and the imaging element. Normally, a method in which the sealing member is held by restricting the edges is used, but because the sealing member elastically deforms comparatively freely, holding the sealing member is a difficult. In addition, in the case of a method in which the optical filter is fastened to the holding member of an imaging element by an adhesive or the like, the operability becomes unfavorable.

Conventionally, a method in which the position and the tilt of the imaging element on the optical axis are finely adjusted is known. A compression spring is provided between a ground plate of an imaging element and a support plate on which the imaging element is attached, a plurality of adjustment screws are used for moving the support plate in the optically axial direction with respect to the ground plate, and an operator changes the amount of screw-in thereof. In this case, a dedicated compression spring becomes necessary, and the operation is troublesome.

Thus, Laid Open Japanese Patent Application No 2005-020103 discloses a configuration in which the edges of an optical filter interposed between rubber pieces and sealed by a metal plate from the front in the optical axis direction. In addition, in the mechanism disclosed in Laid Open Japanese Patent Application No. 2008-193574, instead of adhering the optical filter, an optical member pressing means is provided integrally with the sealing member, and the optical filter is held by being urged toward the support plate of the imaging element.

However, in the conventional technologies, the following situations can occur. In Laid Open Japanese Patent Application No. 2005-020103, because the edge position of the optical filter is determined only by rubber that elastically deforms, the disposition thereof is unstable, and the position is not set. In addition, this is not a configuration that can adjust the position and tilt of the imaging element. In addition, in the Laid Open Japanese Patent Application 2008-193574, when carrying out the adjustment of the position and tilt of an imaging element, the position of the inner periphery of the optical member pressing means changes and is unstable. Thus, there is a possibility that the optical member pressing means may intrude into the photographing light range.

SUMMARY OF THE INVENTION

The imaging apparatus of the present invention improves the positioning precision of the sealing member that is disposed between an optical member and an imaging element in an imaging apparatus.

The imaging apparatus of the present invention for solving the above situation is provided with an imaging element that converts the photographed image that has been formed by an imaging optical system to an electric signal and a holding member of the imaging element. An optical member that is disposed more toward the subject side in the optical axis direction than the imaging element; and a sealing member that is positioned between the optical member and the imaging element and seals the light receiving surface of the imaging element are also provided. The sealing member is formed by an elastic member, and includes a position restricting portion that is inserted between the outer peripheral edge portion of the optical member and the holding member in a direction perpendicular to the optical axis of the imaging optical system and carries out positioning.

Further features of the present invention will become apparent from the following description of exemplary embodiments with reference to the attached drawings.

DESCRIPTION OF THE EMBODIMENTS

Figure 1A:
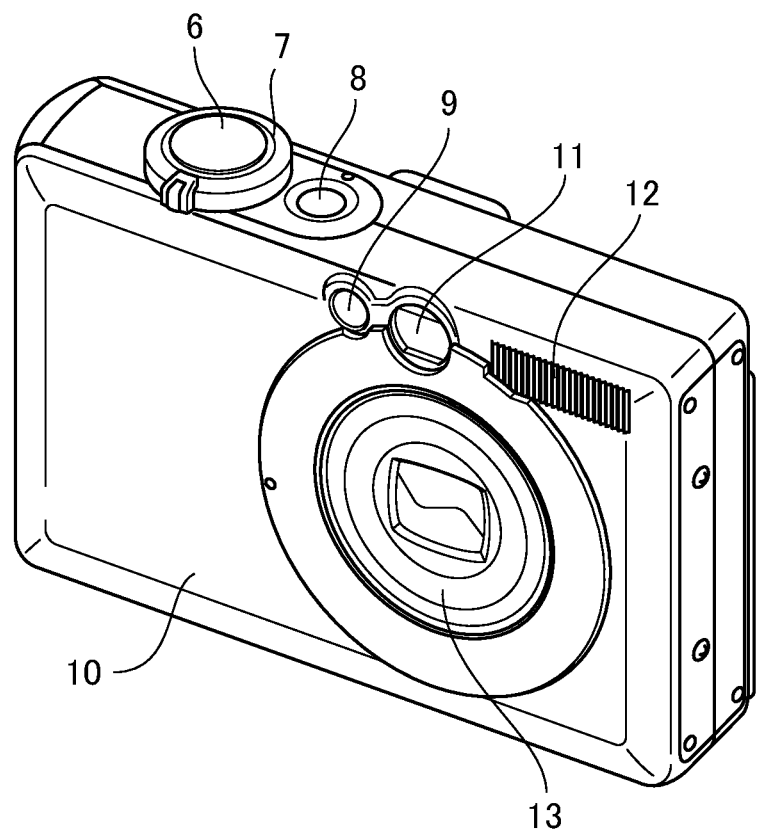
FIG. 1A is a perspective view that shows an example of the external appearance in order to explain, in conjunction with FIGS. 2 to 5, the imaging apparatus according to an embodiment of the present invention.
Figure 1B:
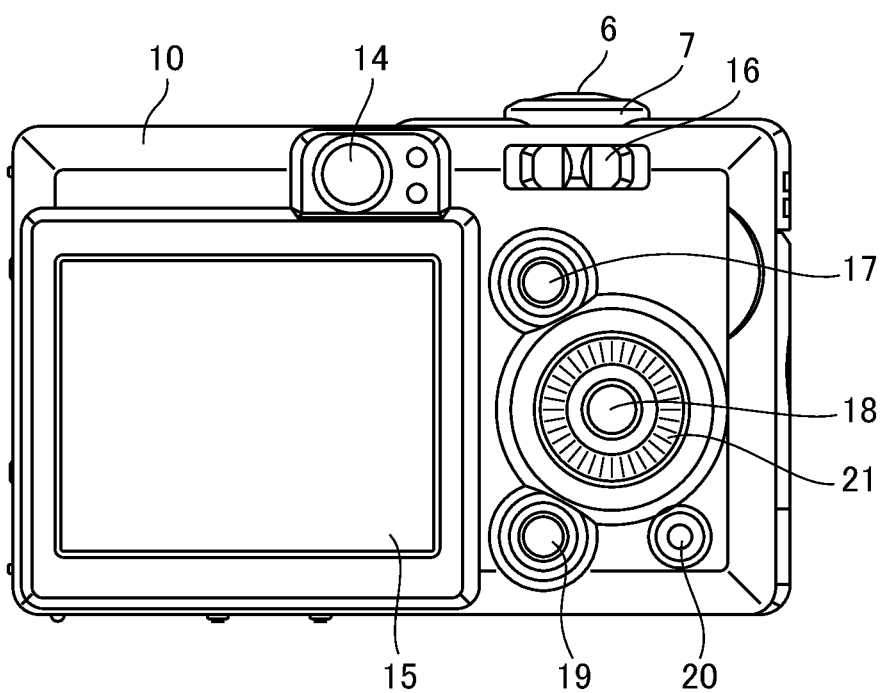
FIG. 1B is a back view that shows an example of the external appearance in order to explain, in conjunction with FIGS. 2 to 5, the imaging apparatus according to an embodiment of the present invention.

Below, an embodiment of the present invention will be explained in detail with reference to the appended figures. FIGS. 1A and 1B exemplifies a digital camera 10 serving as an imaging apparatus according to an embodiment of the present invention. The digital camera 10 includes a zoom mechanism that can change the imaging magnification. FIG. 1A is a perspective view when the digital camera 10 is viewed from the front, and FIG. 1B is a back view of the same.

A view finder 11 that determines the composition of the subject is provided on the front surface of the main body of the digital camera 10, and to the left and right thereof, an auxiliary light source 9 and a strobe 12, which augment the light sources when carrying out light measurement or distance measurement, are provided. An imaging lens barrel 13 is positioned below the view finder 11. In addition, each of the operating portions of a release switch 6, a zoom changing switch 7, and a power source changing switch 8 are positioned on the upper surface of the camera main body. Control members 16 to 21 with which a user carries out a variety of function changes are each disposed on the back surface of the camera main body, and a display 15 is also provided.

Figure 2:
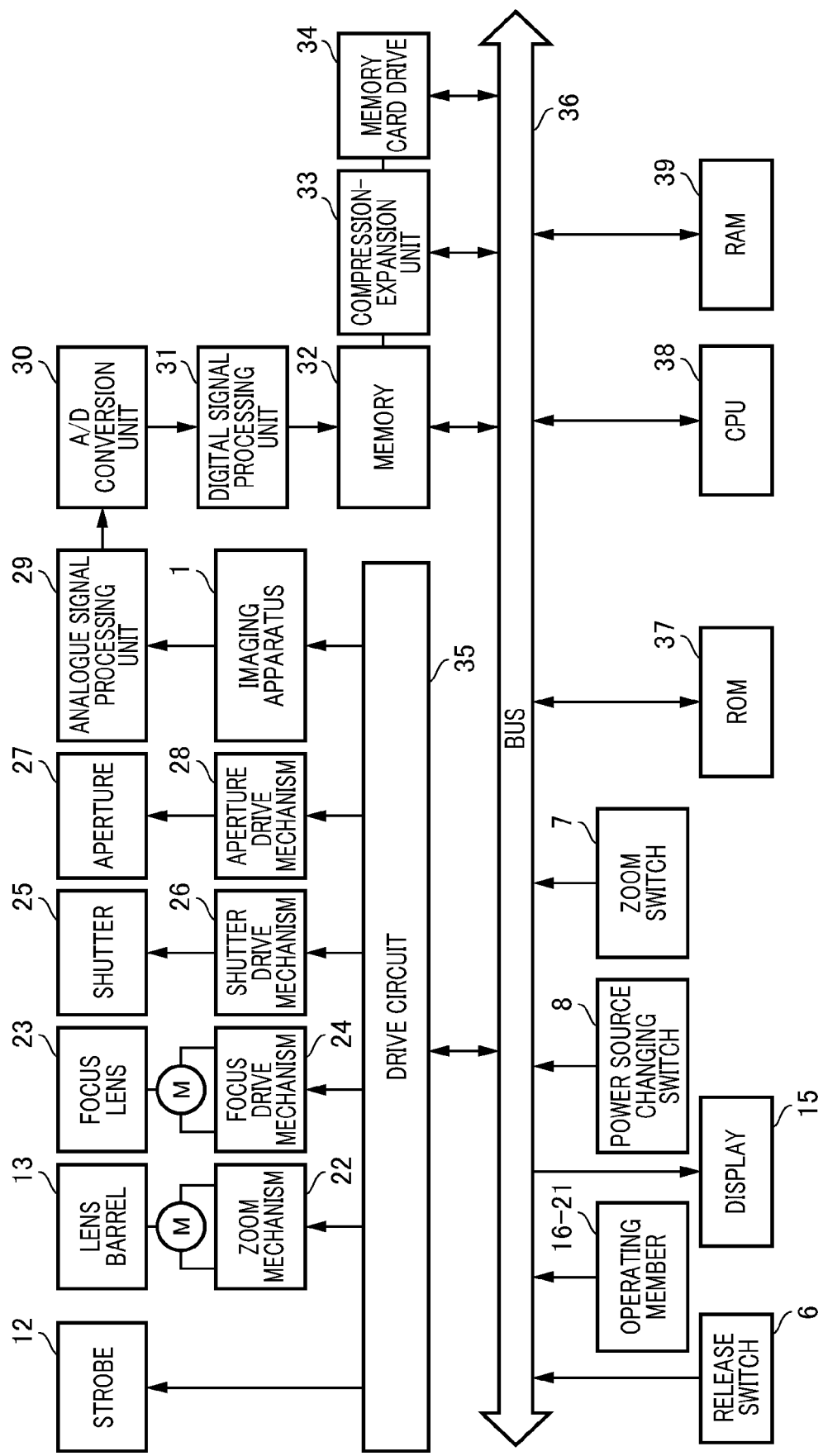
FIG. 2 is a block diagram that shows the principal components of an example of a configuration of an imaging apparatus according to an embodiment of the present invention.

FIG. 2 shows an example of the configuration of the principal components of the digital camera 10. The release switch 6 is configured such that, depending on the amount of pressing, a first switch (below, referred to as "SW1") and a second switch (below, referred to as "SW2") are turned ON in sequence. Specifically, when the user presses the operating portion of the release switch 6 about half way, the SW1 is turned ON. When the user further presses the operating portion of the release switch 6 as far as possible, SW2 is turned ON. In addition, each of the ON signals of SW1 and SW2 are sent to the CPU (central processing unit) 38 via the bus 36.

A display 15 consisting of an LCD (liquid crystal display) is provided on the back face of the camera main body, and a viewfinder eyepiece portion 14 is disposed thereabove (refer to FIG. 1B). The display 15 displays an image on the screen according to image data that has been stored on a memory 32 or image data that has been read from a memory card. A CPU 38, ROM (read only memory) 37, and RAM (random access memory) 38 which form the control portion, control each portion via the bus 36. The principal elements of the configuration of the operation devices such as the release switch 6 and the operation members 16 to 21 and the like, the display 15, the memory 32, and the memory card drive 34 and the like are connected via the bus 36. Note that the viewfinder 11 and the viewfinder eyepiece portion 14 are not necessarily required, and an image to be photographed may be viewed in the display 15.

The drive circuit 35 is connected to the control portion via the bus 36, and drives the zoom mechanism 22, the focus drive mechanism 24, the shutter drive mechanism 26, the aperture drive mechanism 28, and the strobe 12. In addition, the imaging element 1, which converts a subject image that has been formed by passing through an imaging optical system (not illustrated) to an electric signal, is connected to the drive circuit 35. Image sensors that use a CCD (charge coupled device) or CMOS (complementary metal oxide semiconductor) and the like are used in the imaging element 1. Depending on the signal from the control unit, the drive circuit 35 drives each of the drive mechanisms and the imaging element 1. The control programs for controlling each portion are stored on the ROM 37, and the data that is necessary for the control program is stored on the RAM 39.

An analog signal processing unit 29 applies a predetermined analogue signal processing to image data that has been obtained from the imaging element 1, and a downstream A/D conversion unit 30 converts the analogue data that has been read to digital data. After the digital signal processing unit 31 has processed this digital data, the data is finally stored on the memory 32. A compression-expansion unit 33 carries out expansion processing on the image data that has been stored on the memory 32 or the image data that has been stored on memory card drive 34. This image data is sent to the display 15 via the bus 36, and the image is displayed. The user views the image on the display 15, and when the user has determined that the image is not necessary, the user can delete the data for the image by operating the operating member 21.

Figure 3A:
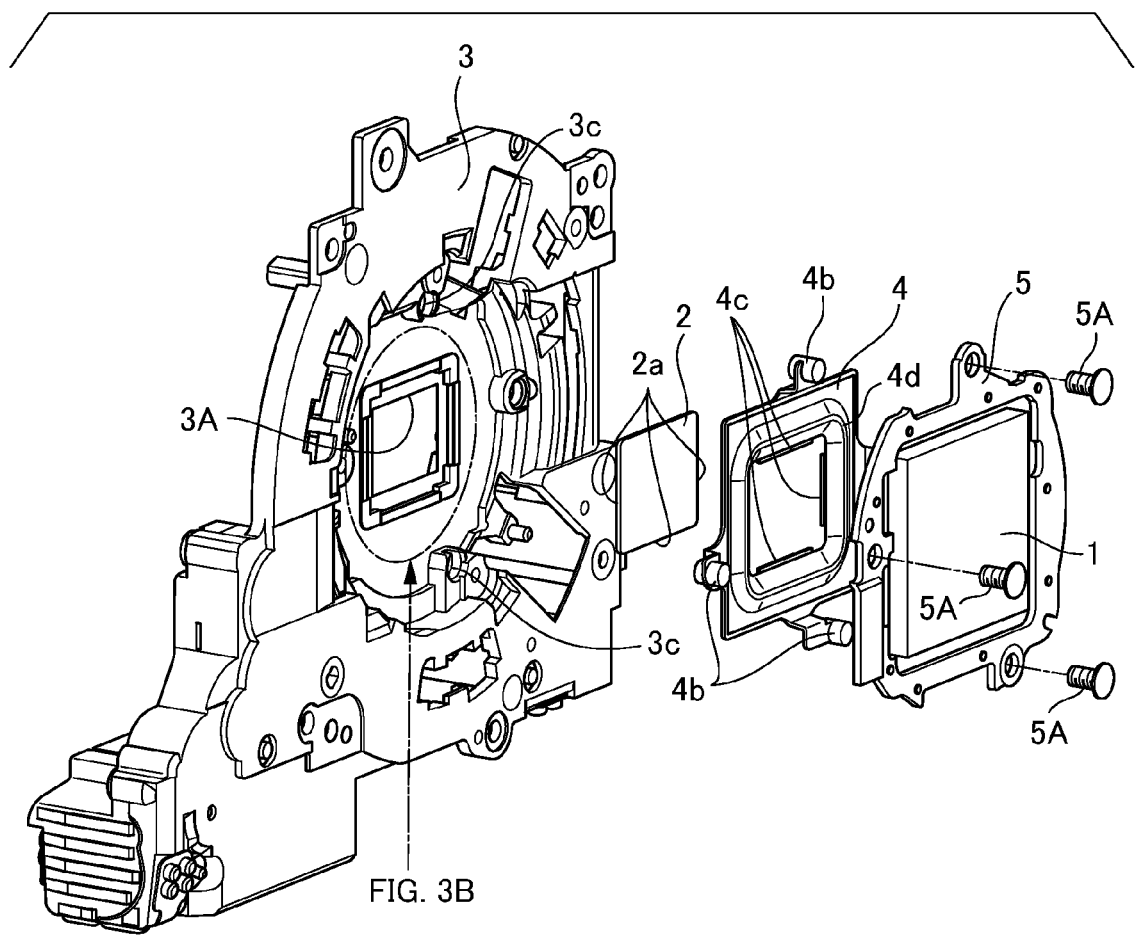
FIG. 3A is an exploded perspective view that shows the sealing structure of an imaging apparatus according to an embodiment of the present invention.
Figure 3B:
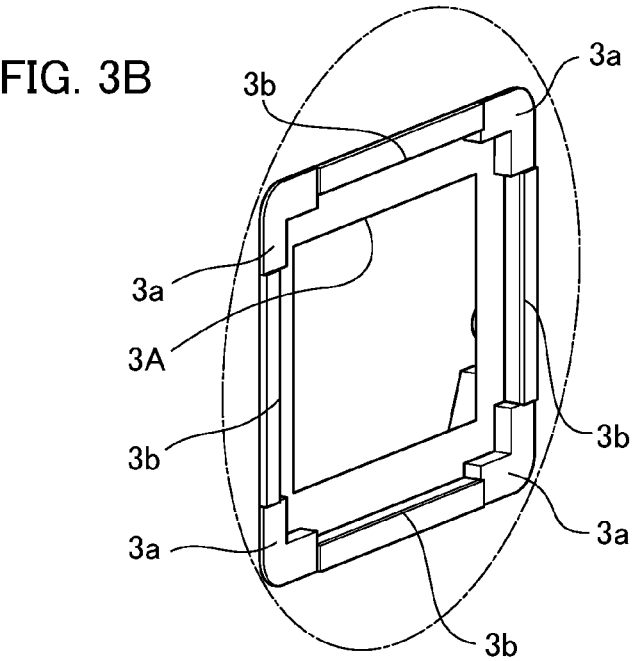
FIG. 3B is an enlarged view showing a portion of FIG. 3A.
Figure 4A:
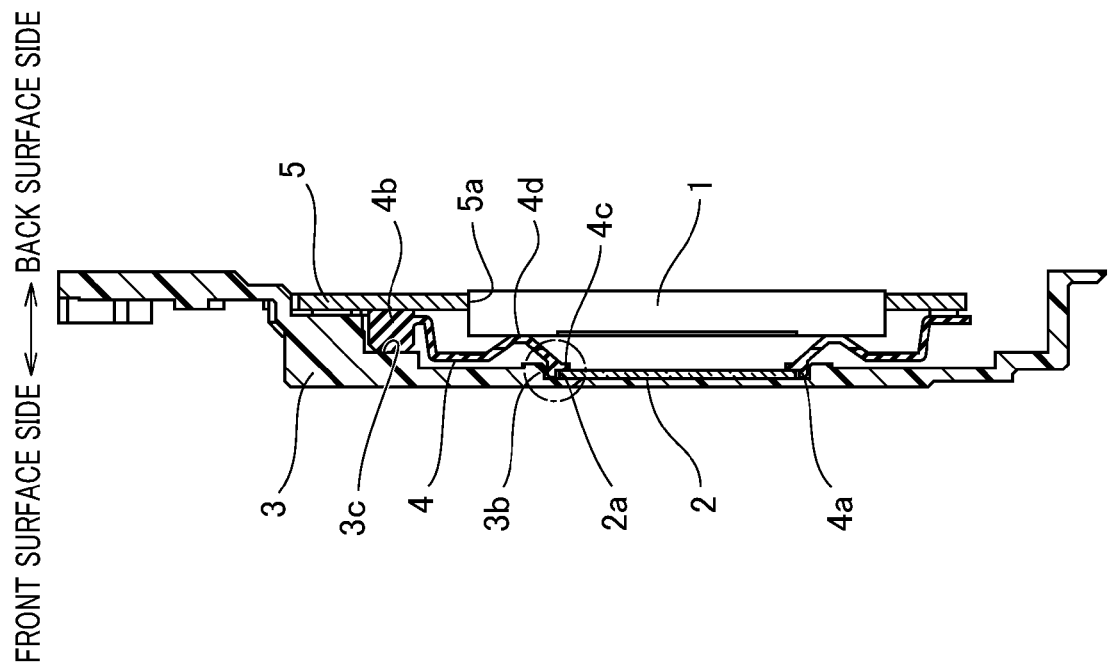
FIG. 4A is a cross-sectional view of the sealing structure of the imaging apparatus according to an embodiment of the present invention.
Figure 4B:
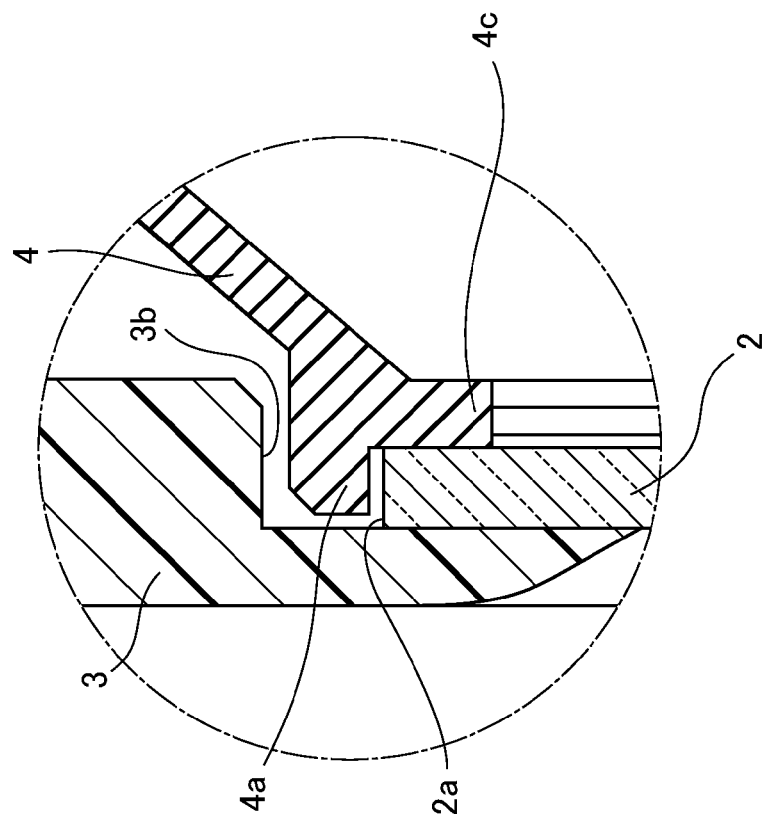
FIG. 4B is a detailed view of the position restricting portion of the sealing structure of an imaging apparatus.

Next, the holding mechanism for the imaging element 1 in the imaging lens barrel 13 will be explained. FIG. 3A is an exploded perspective view that exemplifies the sealing structure of the imaging element 1, and FIG. 3B shows an enlargement of a portion of the holding member 3. FIG. 4A is a cross-sectional view that shows the sealing structure of the imaging element 1, and FIG. 4B is a detailed view that shows the position regulating portion of the sealing structure. Below, the subject side will be denoted by "front surface" and "front".

The optical member 2 is arranged on the back surface of the holding member 3, which serves as a base. The optical member 2 is formed by an optical filter or glass and the like that cuts the high frequency noise component of the light that is irradiated to the light receiving surface of the imaging element 1. An opening portion 3A, into which the optical member 2 is inserted, is formed as a square hole in the holding member 3. The four-corner portions on the periphery of the opening portion 3A form the holding portions 3a for the optical member 2, and perform the positioning of the optical member 2. Peripheral wall portions 3b that extend vertically and horizontally in FIG. 3 along each of the sides of the square shape are respectively formed between each of the holding portions 3a.

As shown in FIG. 4A, the optical member 2 is assembled on the back surface of the holding member 3, and the elastic sealing member 4 is disposed at the back surface of the holding member 3. Furthermore, an imaging element 1 and a support plate 5, which is a support member for the imaging element 1, are disposed on the back surface of the holding member 3. The sealing member 4 has the role of preventing foreign matter such as contaminants from adhering to the surface of the optical member 2 and the imaging element 1. In the case in which a fine foreign matter has adhered to the surface of the optical member 2, which is disposed in proximity to the focal plane of the imaging optical system, or the surface of the imaging element 1, the sealing member 4 is important as a countermeasure for dust protection because there is a concern that a foreign matter may be appear as a ghost image in a photograph.

Figure 5A:
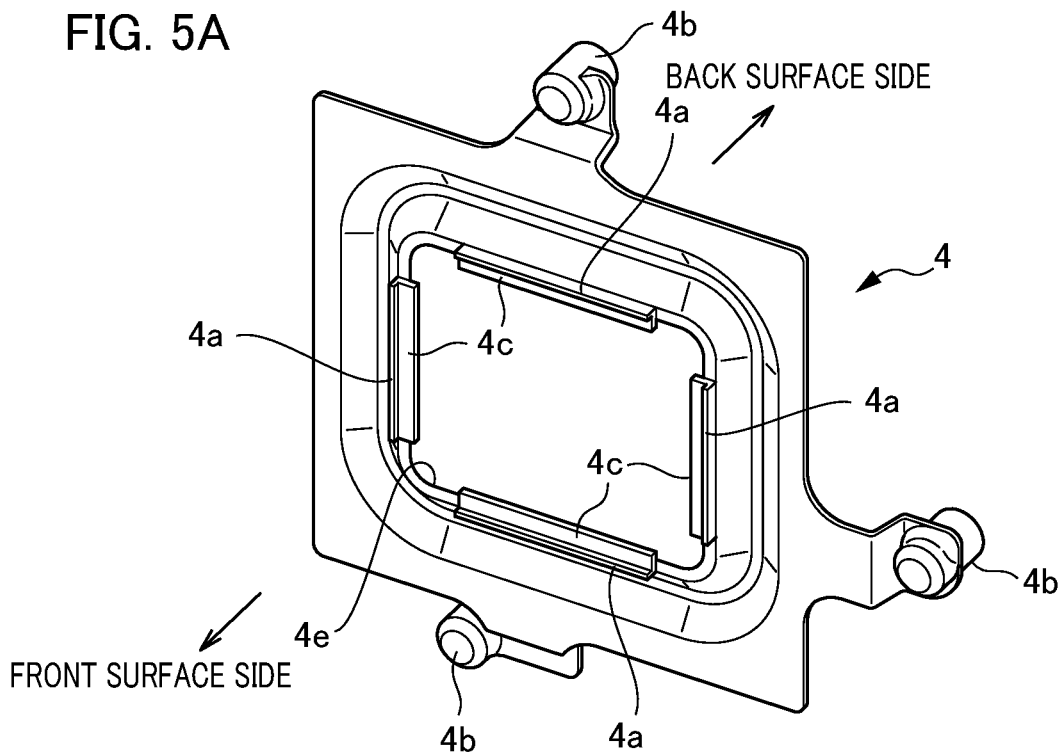
FIG. 5A is a perspective view when the sealing member is viewed from the front at an angle.
Figure 5B:
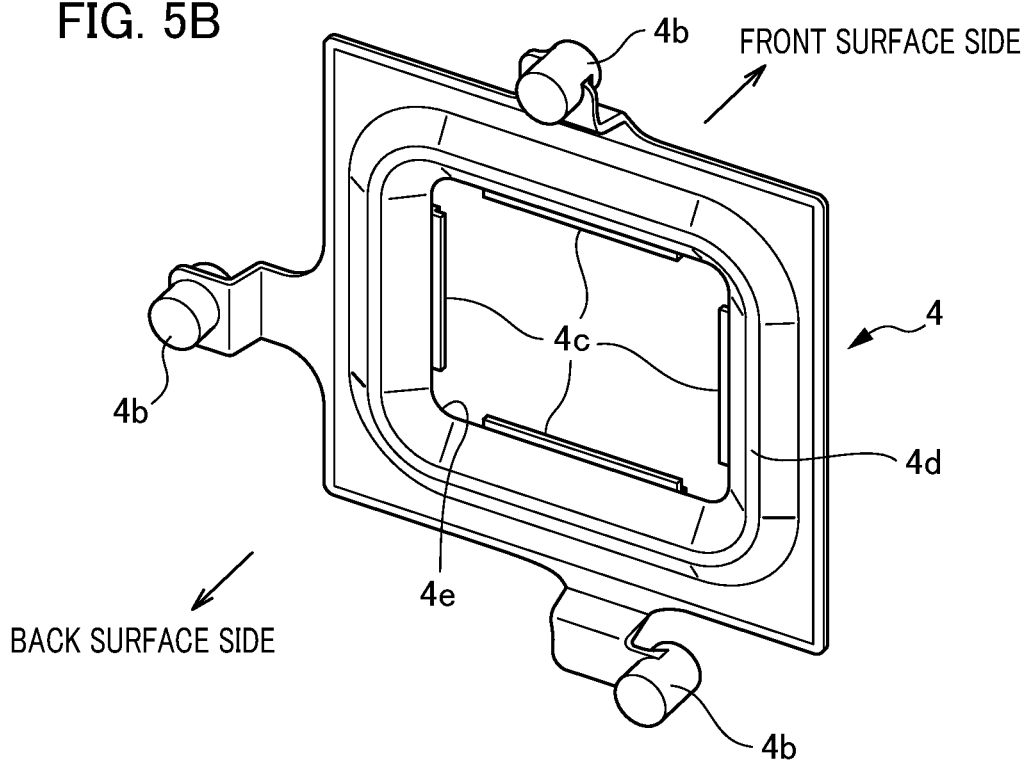
FIG. 5B is a perspective view when the sealing member is viewed from the back at an angle.

In the present embodiment, the elastic force of the sealing member 4 is used in the position adjustment and the tilt adjustment of the imaging element 1 in the optical axis direction. Here, the detailed shape of the sealing member 4 will be explained with reference to FIG. 5A and FIG. 5B. FIG. 5A is a perspective view when the sealing member 4 is viewed from the front at an angle, and FIG. 5B is a perspective view when the sealing member 4 is viewed from the back at an angle.

When viewed from the front, the sealing member 4 has a rectangular shape that is smaller than the outer dimensions of the support plate 5 and larger than the opening portion 5a of the support plate 5, and an opening portion 4e that is smaller than the outer dimensions of the optical member 2 is formed at the center. Four position regulating portions 4a that project toward the front are each formed at the front surface on the inner peripheral edge of the opening portion 4e. The back surface of the outer peripheral edge portion of the sealing member 4 abuts the supporting plate 5.

Projecting elastic loading portions 4b (projecting portions) that extend toward the front in the optical axial direction are integrally formed on the outer peripheral edge portion of the sealing member 4. In this example, one elastic loading portion 4b is provided on each of the top end and the bottom end of the sealing member 4, and one elastic loading portion 4b is provided at the right end somewhat below the center. That is, a total of three elastic loading portions 4b (projecting portions) are provided on the outer peripheral edge portion of the sealing member 4. As shown in FIG. 4A, these elastic loading portions 4b are formed in a circular column shape along the optical axis direction, and can expand and contract in a longitudinal direction. The front ends of the elastic loading portions 4b abut the holding member 3 so as to be inserted into a closed-end holes 3c that are formed in the holding member 3, and the back end of the elastic loading portions 4b abut the supporting plate 5. While the sealing member 4 is installed on the holding member 3, each of the elastic loading members 4b are arranged at a position adjacent to an adjustment screw, which will be described below. An operator can carry out position adjustment and tilt adjustment of the imaging element 1 in the optical axis direction by changing screw-in amount of the adjustment screws.

Pressing portions 4c are portions that press the optical member 2 toward the side of the holding member 3, and are integrally formed with the position regulating portions 4a. The portions that project from the pressing portions 4c toward the back at an angle are urging portions 4d that abut the front surface of the imaging element 1, and the optical member 2 and the imaging element 1 are urged in a direction of separation. While the sealing member 4 is installed between the holding member 3 and the supporting plate 5, the urging member 4d surrounds the light receiving surface of the imaging element 1 while being attached to the periphery thereof, and prevents dust and the like from adhering to the light receiving surface. In addition, when the force acts toward the front with respect to the sealing member 4 along the optical axis direction, an elastic force acts on the imaging element 1 and the optical member 2 due to the urging portions 4d. That is, when the supporting plate 5 is moved toward the front with respect to the optical axis direction, the optical member 2 is urged toward the front via the position regulating portions 4a by the elastic force of the urging portions 4d, and at the same time, the imaging element 1 is urged toward the back. Because no gap occurs between the optical member 2 and the sealing member 4 or between the front surface of the imaging element 1 and the sealing member 4, the optical member 2 and the imaging element 1 are tightly sealed, and the penetration of foreign matter can be prevented.

Next, the installation of the optical member 2, the sealing member 4, imaging element 1, and the supporting plate 5 on the holding member 3 will be explained with reference to FIG. 4A and FIG. 4B. An operation is carried out in which the supporting plate 5, on which the optical member 2, the sealing member 4, and the imaging element 1 have been installed, is assembled in the holding member 3 in this order. At this time, each of the elastic loading members 4b of the sealing member 4 is inserted into the closed-end holes 3c that have been formed in the holding member 3. Subsequently, the supporting plate 5 is attached to the holding member 3 by screw fastening after adjustment.

The sealing member 4 is formed by an elastic material such as rubber or the like, and in an attachment method in which an approximate position is determined by the edge as is done conventionally, when the sealing member 4 has been pressed inward (the side approaching the optical axis) during the assembly operation, a portion thereof may penetrate into the effective light flux range.

When the holding member 3 is being assembled, the positioning of the edges of the sealing member 4 is carried out, and the sealing member 4 is restricted so as not to penetrate inside. That is, as shown in FIG. 4B, in a direction perpendicular to the optical axis of the imaging optical system, the position regulating portion 4a of the sealing member 4 is inserted between the outer peripheral edge portion 2a of the optical member 2 and the peripheral wall portion 3b of the holding member 3. Inward deformation is prevented by the position regulating portions 4a abutting the outer peripheral edge portions 2a. In addition, the outside portion of the position regulating portion 4a is regulated by the peripheral wall portion 3b of the holding member 3.

Pressing portions 4c that press the optical member 2 toward the side of the holding member 3 and the urging portions 4d that apply a pressing force to the imaging element 1 are provided on the sealing member 4. By assembling the optical member 2 and the imaging element 1 in the holding member 3, a reactive force is applied to each by the sealing member 4, and they can thereby fastened only by the elastic force of the sealing member 4 without attaching the optical member 2 by bonding or the like. At this time, the supporting plate 5, to which the imaging element 1 has been attached, is attached by three adjustment screws 5A (refer to FIG. 3) to the holding member 3. The elastic loading portions 4b are integrally provided on the sealing member 4 in proximity to the adjustment screws 5A, and are disposed so as to be interposed between the supporting plate 5 and the holding member 3. The operator uses the reactive force of the elastic loading portions 4b by changing the screw-in amount of the three adjustment screws 5A to adjust and hold the tilt and the position of the imaging element 1. Optical adjustment is carried out by changing the rotation amount of the adjustment screws 5A to change the position and the attitude of the imaging element 1 in conformity to the imaging optical system.

Note that when the three adjustment screws 5A are rotated so as to increase their the screw-in amount, the elastic force produced in the pressing portions 4c and the urging portions 4d is set so as to be smaller than the elastic force produced in the elastic loading portions 4b. Therefore, even if the supporting plate 5 is moved in an optical axis direction by changing the screw-in amount of the three adjustment screws 5A, the optical adjustment of the imaging element 1 is carried out with only the elastic force generated in the elastic loading portions 4b. Thus, the holding of the optical member 2 and maintaining the sealed structure between the optical member 2 and the imaging element 1 is possible.

In the case in which the elastic loading members 4b are compressively deformed when the optical adjustment of the imaging element 1 is carried out, the sealing member 4 is pressed further inward when the positions of the pressing portions 4c of the optical member 2 become unstable, and the possibility that the sealing member 4 will penetrate the effective light flux becomes high. In the present embodiment, the pressing portion 4c of the optical member 2 can be prevented from deforming toward the optical axis side.

As explained above, according to the present embodiment, the position of the sealing member 4 that is disposed between an optical member and an imaging element in an imaging apparatus can be determined accurately and with high precision, and influence on the imaging optical system is prevented.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-102805 filed May 2, 2011 which is hereby incorporated by reference herein in its entirety.

What is claimed is:
1. An imaging apparatus comprising:
an imaging element that converts an optical image to an electric signal;
an optical member that is disposed in front of the imaging element;
a holding member that holds the imaging element and the optical member; and an elastic sealing member that is positioned between the optical member and the imaging element, and seals a space between the optical member and the imaging element, wherein the holding member has a plurality of holding portions which holds the optical member, and a wall portion formed between the plurality of holding portions, wherein the optical member is held by the plurality of holding portions, so that a gap between an outer peripheral edge portion of the optical member and an outer wall portion is provided, wherein the elastic sealing member has a position restricting portion, and wherein the sealing member is arranged so that the position restricting portion is inserted into the gap.

2. The imaging apparatus according to claim 1, wherein the optical member is an optical filter that cuts off high frequency noise component of light that irradiates the light receiving surface of the imaging element.

3. The imaging apparatus according to claim 1, wherein the elastic sealing member has a pressing portion that presses the optical member toward the holding member, and wherein the elastic sealing member has an urging portion that abuts the imaging element and urges the imaging element in a direction away from the optical member.

4. The imaging apparatus according to claim 1, further comprising:

a support member on which the imaging element is installed, wherein the elastic sealing member has an elastic loading portion that is arranged between the holding member and the support member, and wherein the elastic loading portion applies a load to the support member in a direction of opposite to the holding member.

5. An imaging apparatus comprising:

an imaging element that converts an optical image to an electric signal;

an optical member that is disposed in front of the imaging element;

a holding member that holds the optical member; and an elastic sealing member that is positioned between the optical member and the imaging element, and seals a space between the optical member and the imaging element, wherein the holding member has a plurality of holding portion which holds the optical member, and a wall portion formed between the plurality of holding portions, wherein the optical member is held by the plurality of holding portions so that a gap between an outer peripheral edge portion of the optical member and the wall portion is provided, wherein the elastic sealing member has a position restricting portion, and wherein the elastic sealing member is arranged so that the position restricting portion is inserted into the gap.

6. The imaging apparatus according to claim 5, wherein the optical member is an optical filter that cuts off high frequency noise component of light that irradiates the light receiving surface of the imaging element.

7. The imaging apparatus according to claim 5, wherein the elastic sealing member has a pressing portion that presses the optical member toward the holding member, and wherein the elastic sealing member has an urging portion that abuts the imaging element and urges the imaging element in a direction away from the optical member.

8. The imaging apparatus according to claim 5, further comprising:

a support member on which the imaging element is installed, wherein the elastic sealing member has an elastic loading portion that is arranged between the holding member and the support member, and wherein the elastic loading portion applies a load to the support member in a direction of opposite the holding member.

9. The imaging apparatus according to claim 1, wherein the holding member has a first opening portion, and wherein the plurality of holding portions are formed near corner portions of the first opening portion.

10. The imaging apparatus according to claim 1, wherein the elastic scaling member has a second opening portion, and wherein the position restricting portion is formed near the peripheral portion of the second opening portion.

11. The imaging apparatus according to claim 5, wherein the holding member has a first opening portion, and wherein the plurality of holding portions are formed near corner portions of the first opening portion.

12. The imaging apparatus according to claim 5, wherein the elastic sealing member has a second opening portion, and wherein the position restricting portion is formed near the peripheral portion of the second opening portion.

13. An imaging apparatus comprising:

an imaging element that converts an optical image to an electric signal;

an optical member that is disposed in front of the imaging element;

a holding member that holds the optical member; and an elastic sealing member that is positioned between the optical member and the imaging element, and seals a space between the optical member and the imaging element, wherein the holding member has a plurality of holding portion which holds the optical member, and a wall portion formed between the plurality of holding portions, wherein the optical member is held by the plurality of holding portions while a gap between an outer peripheral edge portion of the optical member and the wall portion is provided so that a part of the elastic sealing member is inserted into the gap.

14. The imaging apparatus according to claim 13, wherein the optical member is an optical filter that cuts off high frequency noise component of light that irradiates the light receiving surface of the imaging element.

15. The imaging apparatus according to claim 13, wherein the elastic sealing member has a pressing portion that presses the optical member toward the holding member, and wherein the elastic sealing member has an urging portion that abuts the imaging element and urges the imaging element in a direction away from the optical member.

16. The imaging apparatus according to claim 13, further comprising:

a support member on which the imaging element is installed, wherein the elastic sealing member has an elastic loading portion that is arranged between the holding member and the support member, and wherein the elastic loading portion applies a load to the support member in a direction opposite to the holding member.

17. The imaging apparatus according to claim 13, wherein the holding member has a first opening portion, and wherein the plurality of holding portions are formed near corner portions of the first opening portion.

18. The imaging apparatus according to claim 13, wherein the elastic sealing member has a second opening portion, and wherein the part of the elastic sealing member that is inserted into the gap is formed near the peripheral portion of the second opening portion.

* * * * *